(12) United States Patent
Schmidt Ferreira et al.

(10) Patent No.: US 12,212,182 B2
(45) Date of Patent: Jan. 28, 2025

(54) LAMINATED STATOR COMPOSED OF SYMMETRICALLY ROTATED PACKAGES OF PLATES

(71) Applicant: WEG EQUIPAMENTOS ELETRICOS S.A., Jaragua do Sul (BR)

(72) Inventors: Alexandre Schmidt Ferreira, Jaragua do Sul (BR); Robson Gomes Da Silva, Jaragua do Sul (BR); Wellington Renan Holler, Jaragua do Sul (BR)

(73) Assignee: WEG EQUIPAMENTOS ELETRICOS S.A., Jaragua do Sul (BR)

( * ) Notice: Subject to any disclaimer, the term of this patent is extended or adjusted under 35 U.S.C. 154(b) by 202 days.

(21) Appl. No.: 17/999,686

(22) PCT Filed: Jun. 11, 2021

(86) PCT No.: PCT/BR2021/050255
§ 371 (c)(1),
(2) Date: Nov. 22, 2022

(87) PCT Pub. No.: WO2022/006646
PCT Pub. Date: Jan. 13, 2022

(65) Prior Publication Data
US 2023/0291246 A1    Sep. 14, 2023

Related U.S. Application Data

(60) Provisional application No. 63/048,282, filed on Jul. 6, 2020.

(51) Int. Cl.
H02K 1/12    (2006.01)
H02K 1/02    (2006.01)

(52) U.S. Cl.
CPC ............... *H02K 1/12* (2013.01); *H02K 1/02* (2013.01)

(58) Field of Classification Search
CPC ........ H02K 1/02; H02K 1/12; H02K 2201/06; H02K 15/024; H02K 1/16
See application file for complete search history.

(56) References Cited

U.S. PATENT DOCUMENTS 5,173,629 A * 12/1992 Peters ...................... H02K 1/20
310/58
7,501,734 B2    3/2009 Takahashi et al.
(Continued)

FOREIGN PATENT DOCUMENTS

BR    112019000128 A2    4/2019
BR    112019018174 A2    4/2020
(Continued)

OTHER PUBLICATIONS

International Search Report and Written Opinion for Corresponding International Application No. PCT/BR2021/050255, 7 pages, Sep. 14, 2021.

*Primary Examiner* — Mohamad A Musleh
(74) *Attorney, Agent, or Firm* — LUCAS & MERCANTI, LLP

(57) ABSTRACT

A stator composed of package of plates rotated symmetrically, in multiples or divisors of 120° and also multiple of 3, contributing to the construction of an electromagnetically symmetric stator, preferably providing the symmetry between the phases of the three-phase motor, in a second plan, the technical effects of a reduction of scrap waste in the stamping process of these plates, and the increase of the heat exchange area for internal cooling for any type of electric motor using this stator. The stator (1) has a plurality of packages of plates (2), each of the packages of plates rotated (Continued)

symmetrically in relation to the subsequent package of plates in the longitudinal radial direction (L).

7 Claims, 1 Drawing Sheet

(56) References Cited

U.S. PATENT DOCUMENTS

| | | | |
|---|---|---|---|
| 2006/0181173 A1* | 8/2006 | Takahashi | H02K 1/16 310/216.011 |
| 2008/0315700 A1* | 12/2008 | Ishikawa | H02K 1/243 310/156.66 |
| 2012/0200192 A1 | 8/2012 | Aharonyan et al. | |

FOREIGN PATENT DOCUMENTS

| | | | | |
|---|---|---|---|---|
| CN | 102377258 A | | 3/2012 | |
| EP | 428323 A | * | 5/1991 | ............... H02K 1/16 |
| EP | 0428323 A2 | | 5/1991 | |
| JP | H1051983 A | | 2/1998 | |
| JP | 2010226951 A | | 10/2010 | |
| KR | 100933049 B1 | | 12/2009 | |
| KR | 100944150 B1 | | 2/2010 | |
| KR | 102013853 B1 | | 8/2019 | |

* cited by examiner

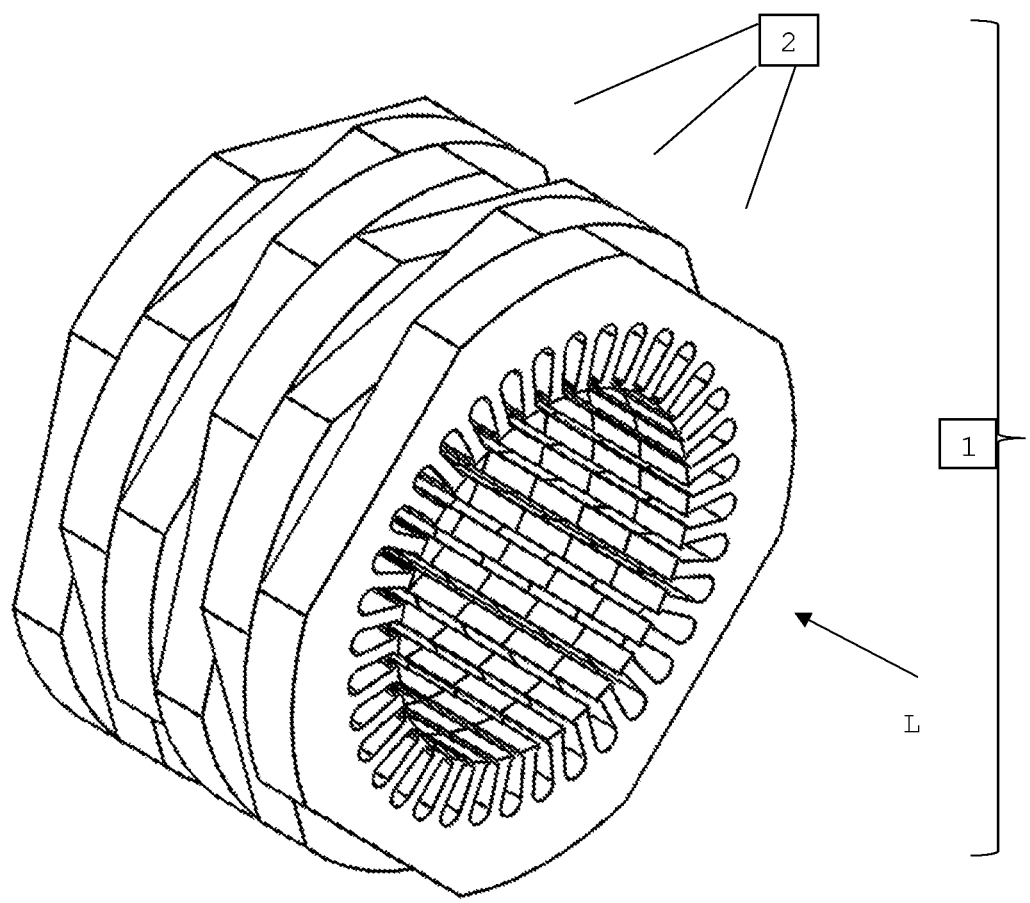

LAMINATED STATOR COMPOSED OF SYMMETRICALLY ROTATED PACKAGES OF PLATES

CROSS REFERENCE TO RELATED APPLICATION

This Application is a 371 of PCT/BR2021/050255 filed on Jun. 11, 2021 which, in turn, claimed the priority of U.S. Provisional Patent Application No. 63/048,282 filed on Jul. 6, 2020, both applications are incorporated herein by reference.

FIELD OF THE DISCLOSURE

The wider technical field of the present disclosure is related to the details of the magnetic circuit characterized by the shape, form, or construction; more specifically related to means for mounting or fastening magnetic stationary parts on to, or to, the stator structures. Another technical field is related to the apparatus specially adapted for manufacturing, assembling, maintaining, or repairing of dynamo-electric machines of stator or rotor bodies.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The stator is the stationary part of a rotary system, found in electric generators, electric motors, sirens, mud motors, or biological rotors. Energy flows through a stator to or from the rotating component of the system. In an electric motor, the stator provides a rotating magnetic field that drives the rotating armature; in a generator, the stator converts the rotating magnetic field to electric current. In fluid powered devices, the stator guides the flow of fluid to or from the rotating part of the system.

The existing stators basically have a structure in which a rotor is inserted therein in a state in which plates are stacked each in front of its subsequent plates. This stator must have its own heat dissipation structure because the stator is continuously subject to energy transfers during the rotation of the rotor. However, since the original plates are commonly sheets having the same area, the heat dissipation effect is not good because all the areas are in close contact with each other in the stacked state.

In addition to inefficient heat dissipation, another main problem is the absence of magnetic symmetry of these systems when the stator sheets have a rectangular shape or any shape that has a variation in the size of the yoke with some difficulties of combining the electrical and physical lag of the coils with the lag of the sheet packages.

Another issue is concerning stators with a plurality of square sheet without plate rotation wherein the magnetic saturation along the stator is irregular, being higher at the points with the lowest yoke and lowest at the points with the largest yoke. So, with the rotation of the sheets, the middle yoke value is approximately the same at each point, and along the entire length of the stator. In this way, magnetic saturation is better distributed throughout the package and losses are less.

KR102013853 is related to a laminated stator and a method for manufacturing a generator and a motor having the same, comprising the steps of circular cutting an electrical steel sheet, cutting into an octagonal combination of a straight line and an arc, forming a first heat dissipation unit and a second heat dissipation unit. Repeating the processing of one electrical steel sheet including the third heat dissipation part forming step and the installation hole forming step and the processing of one electrical steel sheet to process at least a thousand electrical steel sheets and process the processed electrical steel sheet at a predetermined angle. Forming a groove in each electrical steel sheet and welding the groove.

According to KR102013853, an area where corners of the plates making up the stacked stator are exposed becomes wider to improve heat radiation effects. The heat radiation units of the plates making up the stacked stator are stacked, communicate with each other, and consequently penetrate the entire rotor to circulate air through the heat radiation units. The grooves for welding are on the plates making up the stacked stator to maintain a stacked state of the entire rotor to simplify the structure and save installation space.

The abovementioned document recites about forming a plurality of heat dissipating parts so as to be symmetrical to both sides of a reference line dividing an angle between adjacent intermediate points from a center point of the electrical steel sheet; 15° twisted to both sides with respect to the reference line to be both end points of the inclined surface of the second, fourth, sixth, and eighth arc shape, the angle between the two end points of the inclined surface forms a 30° relative to the center point, and the reference line forming first and second heat dissipating parts at points symmetrically with respect to the first and second radiating parts, and forming a third heat dissipating part so as to communicate with the front and rear at the same time as being exposed from the front disc when stacked.

In contrast, the present disclosure proposes a plurality of symmetrically rotated sheets packages, in multiples or divisors of 120° and by multiple of 3, for the construction of an electromagnetically symmetrical stator, which presents symmetry between the phases of the three-phase motor, and, in addition, there is an increase of active material in the stator (yoke), which further improves the thermal exchange. The aim is to provide a balance between the motor phases and the magnetic symmetry of the system, while in the aforementioned document the main objective is to present an improvement in thermal exchanges by the arrangement of the sheets packages, and the dimension of the sheets is defined aiming at this property.

KR100944150 discloses a stack stator to simplify an installation structure by maintaining a stack state of the core plates without a support rod and a support frame. A stack stator is formed by stacking a plurality of core plates. First to fourth inclines are formed on each contact point between outer lines of the core plate. A concave groove is formed on the intermediate point of each incline. A distance from the central point of the core plate to the bottom of the concave groove is equal to the distance between the central point of the core plate to the central point of the outer line. The core plate has an octahedral shape by the first to fourth inclines.

In the invention above a laminated rotor in which core plates in the form of sheets are stacked along an axial direction. The penetrating portion is formed symmetrically at both sides of the reference line that bisects the angle of the liver, each core is laminated in a rotated from while sequentially increasing by a predetermined angle toward the rear.

On the other hands, the present disclosure does not show details in the corners of the stator packages and refers to the rotation of packages of plates, instead of the rotation of individual plate. Moreover, there is a significant difference related to the technical effect achieved due to the presence of magnetic symmetry in the present invention, which is not realized by the patent KR100944150.

KR100933049 discloses a rotation electric device to improve a heat exchange effect by increasing a contact area between the air and a fixing pin through the penetration of the fixing pin. A rotation electric device includes a stator frame, a cooling fan, a plurality of armature cores and a rotor. The cooling fan is arranged in one end of the stator frame in order to cool the armature core. The plurality of armature cores is installed inside the stator frame. A plurality of fixing pins is formed in an outer circumference of the armature core with a regular interval. The height of the fixing pin is equal to the distance between the fixing frame and the armature core. The penetration hole is formed in the fixing pin. The penetration hole occupies 50 to 90% of the area of the fixing pin.

The abovementioned document claims that the device is installed on the stator frame, the fixing pins having a height as much as the distance from the stator frame at a predetermined interval on the outer peripheral surface is formed, three in a set having a phase difference of 10°~80° stacked repeatedly.

The rotary electric machine has an armature core, the armature core includes an armature core that is independently present so that a portion of the pin does not overlap with a neighboring fixing pin and is in direct contact with air.

In KR100933049 the main objective is to increase the thermal dissipation area and the distribution of fixing pins, wherein each plate rotation exists to provide proper positioning of the fixing pins, in order to contribute to the effects of thermal dissipation, without any effect on phase balance and magnetic saturation.

KR100933049, however, does not disclose the constructive shape details similarly to the present disclosure specifically in relation to the plates of the stator, because individual plates are rotated only by 30°, while in the present invention plates sets are rotated by 120°, or by any angle that is an entire multiple or divisors of 120° and multiple of 3, for example, 30°, 60°, 240°, 360°, etc. That is, both conditions must be satisfied, so that magnetic symmetry is achieved. If the angle determined is 20°, for example, only the condition of being a divisor of 120° is satisfied, since this angle is not a multiple of 3, and therefore the symmetry will not occur in three-phase motors.

Furthermore, in KR100933049, the second plate is rotated 30° in relation to the first and the third is rotated by 30° in relation to the second, while the fourth plate returns to the same angular position of the first plate. On the other hand, in the present invention each package of plates is rotated by a specific angle chosen according to the mentioned conditions, in relation to the last package, until forming the complete stator structure. Furthermore, there is no presence of fixing pin on the plates, corroborating the different objectives.

Thereat, there is a significant difference related to the technical effect achieved due to the presence of magnetic symmetry in the present invention, which is not realized by the invention of the cited patent.

U.S. Pat. No. 7,501,734 provides a motor comprising a stator and a rotor. The stator core includes a laminated stator core made of laminated stator core plates in which straight cut surfaces are formed on a circular outer peripheral surface of the laminated stator core plates. The straight cut surfaces of the laminated stator core plates are circumferentially displaced every predetermined laminated stator core plates so that the straight cut surfaces are uniformly distributed in an axial and a circumferential direction of the laminated stator core.

In spite of the rotation of the plates and the improvement of the magnetic part related to the saturation, U.S. Pat. No. 7,501,734 does not mention a capacity of balancing between phases and the rotation angles are different from 120°, and thus the magnetic saturation is worse distributed throughout the package and the losses are higher.

Most of the previous art focus on improving the thermal exchange and/or motor cooling and, despite mentioning the rotation of the stator plates, there is no mention of the magnetic symmetry that the rotation of the packages of plates provides, being the focus on reducing losses and/or flux uniformity.

SUMMARY

The invention is related mainly to a stator composed of packages of plates rotated symmetrically, in multiples or divisors of 120° and also multiple of 3, contributing to the construction of an electromagnetically symmetric stator, preferably providing the symmetry between the phases of the three-phase motor. The proposal also provides, in a second plan, the technical effects of a reduction of scrap waste in the stamping process of these plates, and the increase of the heat exchange area for internal cooling for any type of electric motor using this stator.

BRIEF DESCRIPTION OF THE DRAWINGS

In the drawings:

FIG. 1 illustrates the stator (1) comprising a plurality of packages of plates (2), each of the packages of plates rotated symmetrically in relation to the subsequent package of plates in the longitudinal radial direction (L).

DETAILED DESCRIPTION

In the following description, for the purposes of explanation, numerous specific details are set forth in order to provide a thorough understanding of the present disclosure. It will be apparent, however, that embodiments may be practiced without these specific details. Embodiments are disclosed in sections according to the following outline:

The electromagnetically symmetrical stator (1) comprises a plurality of packages of plates (2), each of the packages of plates rotated in multiples or divisors of 120° and also multiple of 3, symmetrically in relation to the subsequent packages of plates in the longitudinal radial direction (L) of the stator (1).

A stator core (1) comprises a plurality of packages of plates (2) preferably made by an electric steel, and optionally is made by a stamping process and each package of plates is non-symmetrical, preferably substantially square, but not limited in shape.

This stator can be used in single-phase and polyphase motors, being low voltage or high voltage motors, with closed or open enclosure, preferably in three-phase motors, because of the magnetic symmetry of the system. In theory, the invention could be applied to high voltage motors or with different number of phases, but the magnetic symmetry with multiples or divisors of 120° rotation and multiple of 3 is for the three-phase case.

There is also an improvement in the manufacturing process of said stator, since it is not necessary that it has a circular shape, avoiding the excess of scraps, which have high cost. That is, the waste for the construction of an externally circular stator is avoided, because these losses are related to the fine stamping process widely applied in the electric motor industry.

The symmetrical rotation between smaller packages of plates to form the stator allows to achieve symmetry between phases for a three-phase motor. The invention focuses on combining the electrical and physical lag of the coils with the lag of the packages of plates rotated by multiples or divisors of 120° and also multiple of 3, achieving the balance between the motor phases and the magnetic symmetry of the system.

Additionally, the total number of packages should also be a multiple of 3, for example, according to a preferable embodiment of the present invention (FIG. 1), it is possible to identify a total of 6 packages, each of them comprising about 30 plates. However, the possibilities for constructive configurations of the stator can vary, for example, from a minimum of 60 packages, each of them comprising 1 plate, to a maximum of 3 packages, wherein each of them comprising 60 plates, since the number total of plates of each package vary from one plate to ⅓ of the total number of the motor plates.

In balance three-phase motors the lag in the physical position of each phase of the motor is always 120° divided by the number of pole pairs. If the stator plate has an asymmetrical shape, the yoke will have a different height in the region close to each phase, consequently generating an imbalance in the magnetic saturation and phase currents which results in increasing of machine losses. When rotating the plates at angles that are multiples or divisors of 120° and also multiple of 3, the asymmetries of the plate are distributed equally between the phases, reducing these imbalances.

Another relevant factor is the increase in the heat exchange area for internal cooling, for any electric motor topology.

What is claimed is:

1. A stator composed of symmetrically rotated packages of plates, comprising:
    a plurality of packages of plates (2);
    wherein each of the packages of plates is rotated by multiples or divisors of 120° and also multiple of 3, and symmetrically in relation to the subsequent package of plates in the longitudinal radial direction (L) of the stator (1).

2. The stator of claim 1, wherein the total number of packages comprises a multiple of 3.

3. The stator of claim 1, wherein the total number of plates is from one plate to one third of the total number of the motor plates.

4. The stator of claim 1, wherein the stator core comprises a plurality of packages of plates are made by an electrical steel.

5. The stator of claim 1, wherein the plurality of packages of plates (2) is made by a stamping process.

6. The stator of claim 1, wherein the stator is for three-phase motors.

7. The stator of claim 1, wherein each package of plates is non-symmetrical, and substantially square.

* * * * *